United States Patent
Hayashi et al.

[11] Patent Number: 6,106,158
[45] Date of Patent: Aug. 22, 2000

[54] THRUST BEARING AND RETAINER USED THEREIN

[75] Inventors: Tetsuya Hayashi; Hideki Akamatsu; Kazuyuki Yamamoto, all of Iwata, Japan

[73] Assignee: NTN Corporation, Osaka, Japan

[21] Appl. No.: 09/313,987

[22] Filed: May 19, 1999

[30] Foreign Application Priority Data

May 25, 1998 [JP] Japan ................... 10-142491

[51] Int. Cl.$^7$ .................................. F16C 33/46
[52] U.S. Cl. ........................... 384/623; 384/621
[58] Field of Search ................... 384/614, 618, 384/620, 621, 623

[56] References Cited

U.S. PATENT DOCUMENTS

| | | | |
|---|---|---|---|
| 1,330,158 | 2/1920 | Arnold | 384/614 |
| 3,240,542 | 3/1966 | Jahn | 384/623 |
| 3,469,896 | 9/1969 | Pitner | 384/620 |
| 3,972,575 | 8/1976 | Chiba et al. | 384/623 |

*Primary Examiner*—Thomas R. Hannon
*Attorney, Agent, or Firm*—Sughrue, Mion, Zinn, Macpeak & Seas, PLLC

[57] ABSTRACT

A thrust roller bearing assembly includes first and second raceway members (1, 2), a plurality of rolling elements (4), and a generally plate-like annular roller retainer (3) having a plurality of pockets (7) defined therein in a circumferentially extending row. The rolling elements (4) are rollingly accommodated within the corresponding pockets (7), and each of the pockets (7) is delimited by opposite side faces (7a) and opposite end faces (7b). A plurality of projections (8, 9) are formed in each of the opposite side faces (7a) defining the respective pocket (7) in the roller retainer (3), so as to protrude into the respective pocket (7). Some (8) of the projections (8, 9) in each of the opposite side faces (7a) being formed with respective roller retaining pawls (11) positioned adjacent one principal surface of the retainer (3) while the remaining projections (9) are formed with respective roller retaining pawls (12) positioned adjacent the other principal surface of the retainer (3). All of the projections (8, 9) have respective surfaces which are used as guide faces (8a, 9a) for the rolling elements (4).

15 Claims, 6 Drawing Sheets

THRUST BEARING AND RETAINER USED THEREIN

BACKGROUND OF THE INVENTION

1. Field of the Invention

The present invention relates to a thrust bearing assembly of a kind generally used in machines and automobile transmissions, and also to a roller retainer used therein.

2. Description of the Prior Art

In order to avoid an accidental separation of rollers and also to facilitate handling, a thrust needle roller bearing assembly of a shell type has been suggested, in which a pair of raceway members and a roller retainer are assembled non-separably together into a trinitarian unitary structure. One example of this type of the bearing assembly is shown in FIGS. 7A to 8.

Figure 7A:
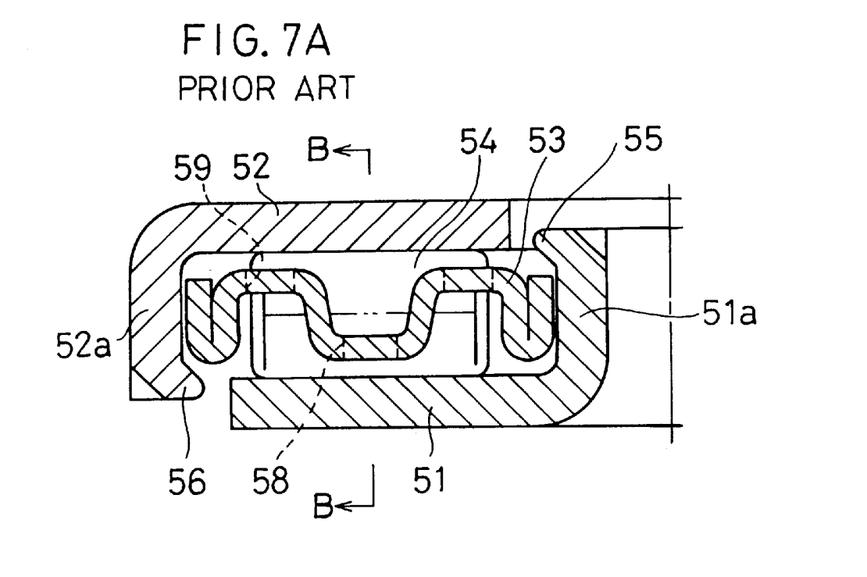
FIG. 7A is a fragmentary sectional view of the prior art thrust roller bearing assembly.
Figure 7B:
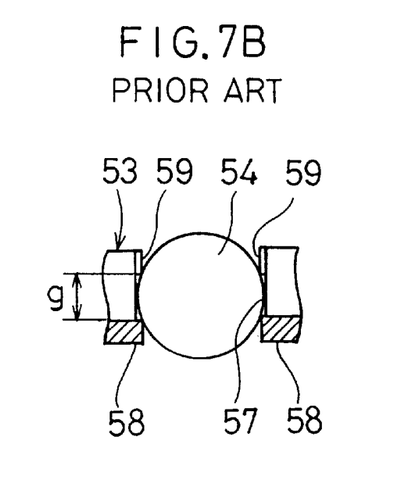
FIG. 7B is a cross-sectional view taken along the line B—B in FIG. 7A.
Figure 7C:
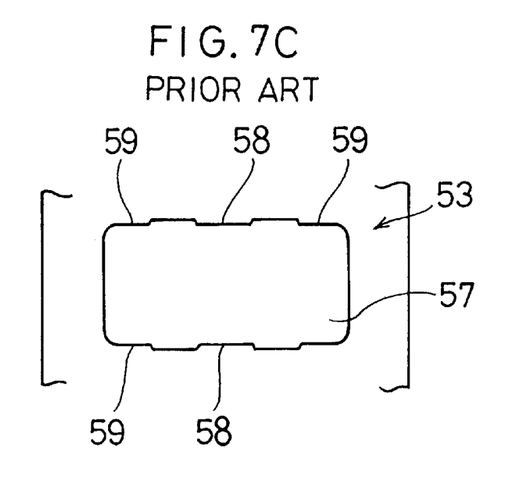
FIG. 7C is a fragmentary top plan view of the roller retainer used in the prior art thrust roller bearing assembly.
Figure 8:
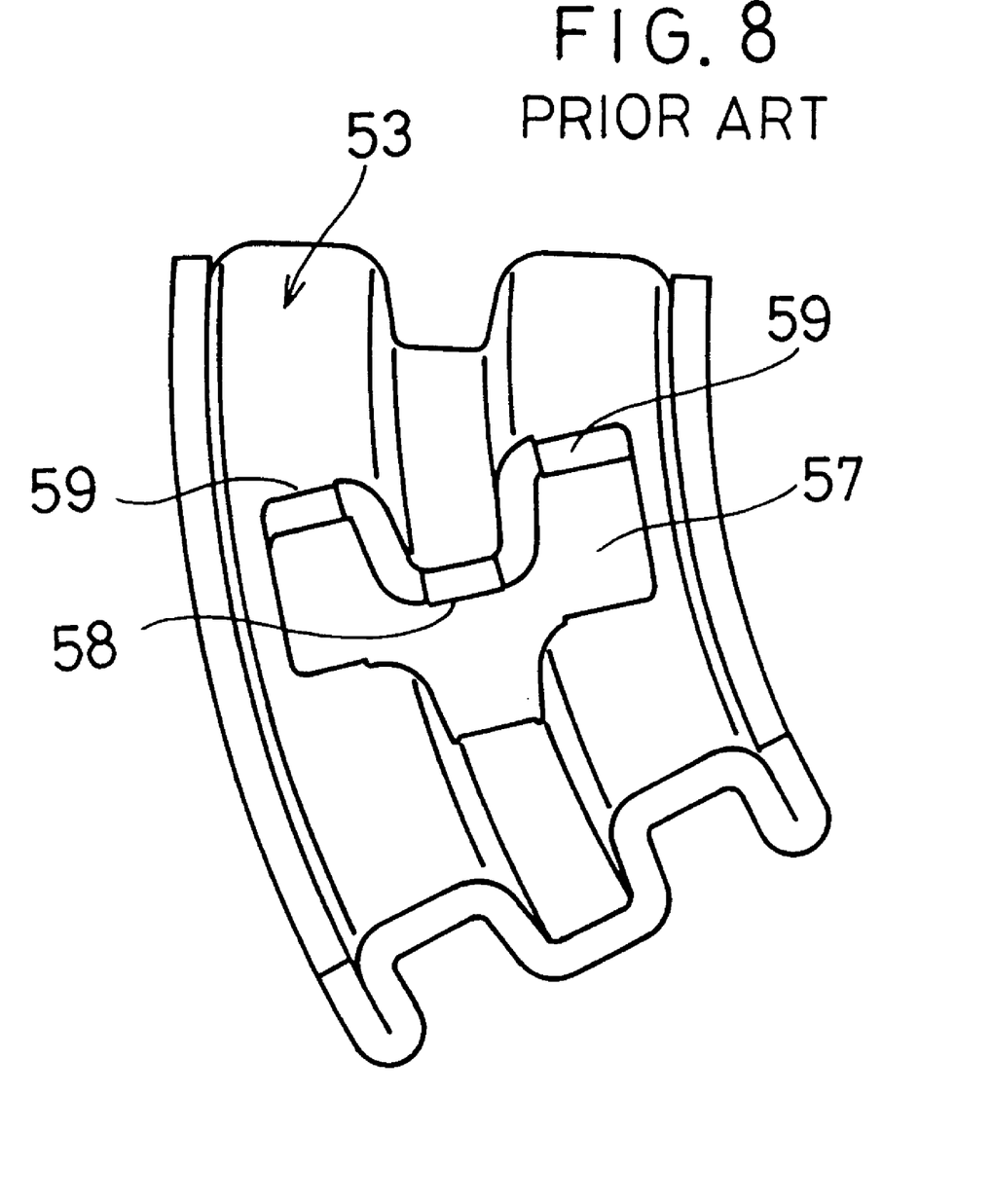
FIG. 8 is a fragmentary perspective view, showing a portion of the roller retainer used in the prior art thrust roller bearing assembly.

Referring to FIGS. 7A to 8, the bearing assembly shown therein comprises a pair of annular raceway members 51 and 52, a plurality of rolling elements 54 and a retainer 53 carrying the rolling elements 54 and interposed between the raceway members 51 and 52. The raceway member 51 which serves as an inner race, has an inner peripheral edge formed with a collar 51a whereas the raceway member 52 which serves as an outer race has an outer peripheral edge formed with a collar 52a. The collars 51a and 52a have respective retaining pawls 55 and 56 formed integrally therewith to keep the roller retainer 53 in a fashion non-separable from the space delimited between the raceway members 51 and 53. The roller retainer 53 is shaped from a thin plate by the use of a press work so as to have a generally W-shaped cross-section having hill portions and a dale portion between the hill portions and has generally rectangular pockets 57 defined therein in a number equal to the number of the rolling elements 54. The hill and dale portions of the roller retainer 53 are formed with roller retaining pawls 58 and 59 so as to protrude a slight distance into the associated pocket 57.

The thrust roller bearing assembly of the trinitarian unitary structure has been found problematic in that depending on the manner of use, the thrust roller bearing assembly would be intermittently subjected to the load by which the roller retainer 53 may be clamped in a radial direction between the respective collars 51a and 51b of the raceway members 51 and 52. Accordingly, if the roller retainer 53 is prepared from the thin plate by the use of the press work such as shown, an attempt to manufacture the thrust roller bearing assembly in a compact size would result in lack of a sufficient physical strength.

By way of example, the thrust roller bearing assembly shown therein is often used in and disposed between a sun gear and a planetary gear in a planetary gear assembly generally used in an automobile transmission. A result of analysis of the behavior of the thrust roller bearing assembly used in the automobile transmission has shown that because during the gear shifting operation the roller retainer 53 had been clamped in a radial direction between the respective collars 51a and 51b of the raceway members 51 and 52 under the influence of the centering action between the raceway members 51 and 52 and because the radial load had therefore repeatedly acted on the roller retainer 53 each time the gear shifting position was changed, a relatively high risk has been shown that the roller retainer 53 lacked a sufficient physical strength. For this reason, demand has been made to increase the physical strength of the roller retainer 53 by means of, for example, using a relatively thick plate as material therefor.

On the other hand, in order to cope with the attempt to compactize the automobile transmission (particularly, the automatic transmission for automobile use) and to permit the automobile transmission to withstand the high load, the bearing assembly has come to be designed within severe dimensional limits, particularly reduction in section. In other words, the use of rolling elements of a reduced size is desired for and, in order to accomplish this in the generally W-shaped roller retainer 53 such as shown in FIGS. 7A to 8, there is no way other than to reduce the thickness of the plate for the roller retainer 53 accompanied by the reduction of the roller retainer 53 and also to increase the number of the rolling elements used with reduction in width of the column between the neighboring pockets 57 in the roller retainer 53.

SUMMARY OF THE INVENTION

Accordingly, the present invention has been devised with a view to substantially eliminating the above discussed problems inherent in the prior art and is intended to provide an improved thrust roller bearing assembly, and an improved retained use therein, in which the retainer can have an increased is wall thickness along with increase in physical strength and which can be easily manufactured.

Another important object of the present invention is to provide securement of a lubricant supply path in the thrust roller bearing assembly of the type referred to above.

A further important object of the present invention is to avoid leakage of a grease filled in various cavities within the thrust roller bearing assembly.

In order to accomplish these objects of the present invention, there is provided a thrust roller bearing assembly which comprises first and second raceway members, a plurality of rolling elements, and a generally plate-like annular roller retainer having a plurality of pockets defined therein in a circumferentially extending row. The rolling elements are rollingly accommodated within the corresponding pockets, and each of the pockets is delimited by opposite side faces and opposite end faces. A plurality of projections are formed in each of the opposite side faces defining the respective pocket in the roller retainer, so as to protrude into the respective pocket. Some of said projections in each of the opposite side faces being formed with respective roller retaining pawls positioned adjacent one principal surface of the roller retainer while the remaining projections are formed with respective roller retaining pawls positioned adjacent the other principal surface of the roller retainer. Each of said projections has a surface on a portion excluding the pawl, which surface is used as a guide face for the rolling element.

Since the roller retaining pawls are formed in the respective projections formed on the opposite side faces defining each pocket in the roller retainer, they can be precisely and easily formed by the use of, for example, a drawing technique even though they are formed in portion of the thickness of the plate. For this reason, it is possible for the roller retainer to have an increased plate thickness, accompanied by an increase in physical strength of the roller retainer and, therefore, the stresses developed in a radial direction in a column between the neighboring pockets in the roller retainer under an intermittently loaded condition can be advantageously reduced sufficiently. Also, since each roller retaining pawl is in the form of a pawl formed in a portion of the respective projection and the surface area of the respective projection is used as a guide surface for the rolling element, it is possible to retain a lubricant oil on the guide surface thereby preventing the oil from being run out and also to eliminate a cause of peeling. In addition, since the roller retainer can have an increased plate thickness and the roller retaining pawls are formed in the portion of the plate thickness, the roller retainer can have a simplified sectional shape and, therefore, not only can the roller retainer be easily formed, but also the number of steps of the press work can be advantageously reduced.

Preferably, the roller retainer carrying the rolling elements is interposed between the first and second raceway members, and the first raceway member comprises a first annular plate having a radially inner edge formed with a first cylindrical collar so as to protrude therefrom towards the second raceway member while the second raceway member comprises a second annular plate having a radially outer edge formed with a second cylindrical collar so as to protrude therefrom towards the first raceway member, each of said first and second collars having respective retaining pawls axially engageable with the roller retainer while the first and second raceway members are axially spaced a distance from each other, whereby the first and second raceway members and the roller retainer are non-separably assembled into a trinitarian unitary structure by the engagement of the retaining pawls.

Assemblage of the first and second raceway members and the roller retainer into the trinitarian unitary structure can result in an excellent handling property. However, although depending on the use of the thrust roller bearing assembly a relatively large load may act on the roller retainer in a radial direction, this radial load can be counteracted by increasing the plate thickness of the roller retainer as hereinbefore described. Also, in such case, since the axial position of the rolling elements in the roller retainer is regulated by the roller retaining pawls that are positioned in a fashion offset relative to each other in a direction across the thickness of the roller retainer, a guide system of the roller retainer may be a roller active guide system.

In the practice of the present invention, the roller retainer may have radially inner and outer portions that are axially offset in position relative to each other with an intermediate portion between the radially inner and outer portions being inclined or curved to render the retainer to have a generally S-shaped section. In such case, the radially inner and outer portions of the retainer may be axially close towards respective portions of the first and second raceway members where the associated collars are formed.

In the case of this structure, even if the respective collars of the first and second raceway members are held at a level lower than the roller guide surface of the adjacent raceway member, it is possible for the roller retainer to be retained by the retaining pawls. Since in this way the respective collars of the first and second raceway members can be formed low, respective gaps between the first and second raceway members and the adjacent collars can be increased to secure a path of supply of a lubricant oil internally of the thrust roller bearing assembly. For this reason, where the thrust roller bearing assembly is employed in the environment in which the lubricant oil splash over the thrust roller bearing assembly, an effective lubrication can be achieved.

Where the roller retainer is shaped to represent a generally S-shape as hereinbefore described, the radially inner and outer portions of the retainer may be axially separated from respective portions of the first and second raceway members where the associated collars are formed. In such case, the first and second raceway members can have the respective collars which are lengthened for the purpose of securement of engagement with the roller retainer, accompanied in reduction in size of the gaps between the collars and the adjacent raceway members and, therefore, a grease filled in the internal space of the thrust roller bearing assembly hardly leaks outside the bearing assembly. For this reason, where the grease is employed as a lubricant, the duration during which the lubricant works satisfactorily can increase.

In the practice of the present invention, the roller retainer may be of a design wherein a radially intermediate portion thereof has a sectional shape protruding in one axial direction. In such case, the projections on each of the side faces defining the respective pocket are formed at three locations including the radially intermediate portion and portions on respective sides of the radially intermediate portion. The projections on the opposite side faces at the radially intermediate portion that protrudes in a thicknesswise direction are provided with roller retaining pawls positioned adjacent a protruded surface, or one principal surface, of the roller retainer 3 while the projections at each of the radially outer and inner portions thereof on the respective sides of the radially intermediate portion are provided with roller retaining pawls positioned adjacent the other principal surface, or a recessed surface, of the roller retainer.

According to this structure, the rolling element in each pocket is retained at six locations by the roller retaining pawls and, therefore, the rolling element can be retained in a stabilized fashion. This structure is particular effective where the ratio of the length of each rolling element relative to the diameter of each rolling element (or, the length/diameter ratio as hereinafter referred to) is large.

Preferably, the roller retainer in its entirety is a flat plate and wherein the projections on each of the side faces defining the respective pocket are formed at three locations including a radially intermediate portion and portions on respective sides of the radially intermediate portion, and the projections on the opposite side faces at the radially intermediate portion are provided with roller retaining pawls positioned adjacent one principal surface of the roller retainer while the projections on the opposite side faces at each of the portions on the respective sides of the radially intermediate portion are provided with roller retaining pawls positioned adjacent the other principal surface of the roller retainer. In this case, since the roller retainer is in the form of the flat plate, the roller retainer can be designed to have an increased wall thickness.

Also, the roller retainer is preferably a press molded product made of steel and wherein the roller retaining pawls are formed by drawing the projections. Where the roller retainer is prepared from a steel plate by the use of the press work, the roller retaining pawls can have a high precision and be easily formed by drawing the projections in each pockets.

The present invention also provides a roller retainer for the roller bearing assembly. This roller retainer comprises an annular plate member having a plurality of pockets defined therein in a circumferential row, each of the pockets being delimited by opposite side faces and opposite end faces, and a plurality of projections formed in each of the opposite side faces defining the respective pocket in the roller retainer, so as to protrude into the respective pocket. Some of said projections in each of the opposite side faces being formed with respective roller retaining pawls positioned adjacent one principal surface of the roller retainer while the remaining projections are formed with respective roller retaining pawls positioned adjacent the other principal surface of the roller retainer. Each of said projections has a surface on a portion excluding the pawl, which surface is used as a guide face for the rolling element.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Referring first to FIGS. 1A to 3B, a thrust roller bearing assembly shown therein in accordance with a first preferred embodiment of the present invention comprises a plurality of needle rollers 4 retained rollingly in a roller retainer 3 and disposed between raceway members 1 and 2 one positioned inside the other. The raceway members 1 and 2 and the roller retainer 3 are made of a steel plate by the use of any known press work. One of the raceway members, for example, the raceway member 1 serves as an inner race while the other of the raceway members, that is, the raceway member 2 serves as an outer race. The raceway member 1 includes an annular plate body 1a having a radially inner edge end formed with a collar 1b so as to extend towards the raceway member 2. Similarly, the raceway member 2 includes an annular plate body 2a having one end formed with a collar 2b so as to extend towards the raceway member 1. The respective collars 1b and 2b of the raceway members 1 and 2 have corresponding retaining pawls 5 and 6 formed integrally therewith so as to protrude generally radially outwardly and inwardly, respectively, towards an annular space delimited between the raceway members 1 and 2. These retaining pawls 5 and 6 are engageable with the roller retainer 3 in a fashion spaced a distance radially therefrom to thereby constrain the roller retainer 3 within the space between the raceway members 1 and 2. As is the case with the prior art thrust roller bearing assembly discussed with reference to FIGS. 7A to 8, the raceway members 1 and 2 and the retainer 3 are thus assembled into the trinitarian unitary structure in which the roller retainer 3 is non-separably constrained within the space between the raceway members 1 and 2 by the engagement with the retaining pawls 5 and 6. Each of those retaining pawls 5 and 6 is formed by bending a local portion of the corresponding collar 1b or 2b radially outwardly or inwardly, respectively, and is employed in a plural number along the circumference of the corresponding collar 1b or 2b.

Figure 1A:
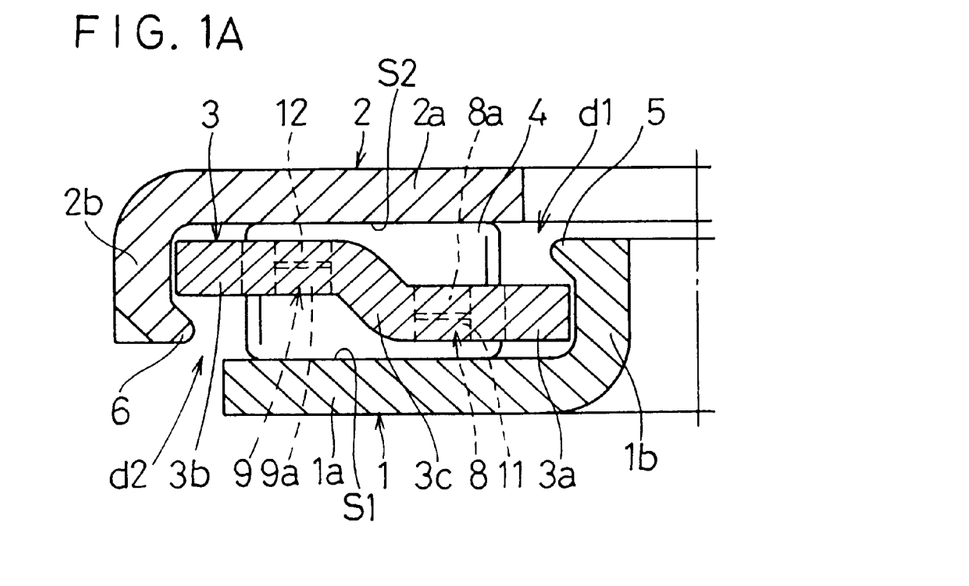
FIG. 1A is a fragmentary sectional view of a thrust roller bearing assembly according to a first preferred embodiment of the present invention.
Figure 1B:
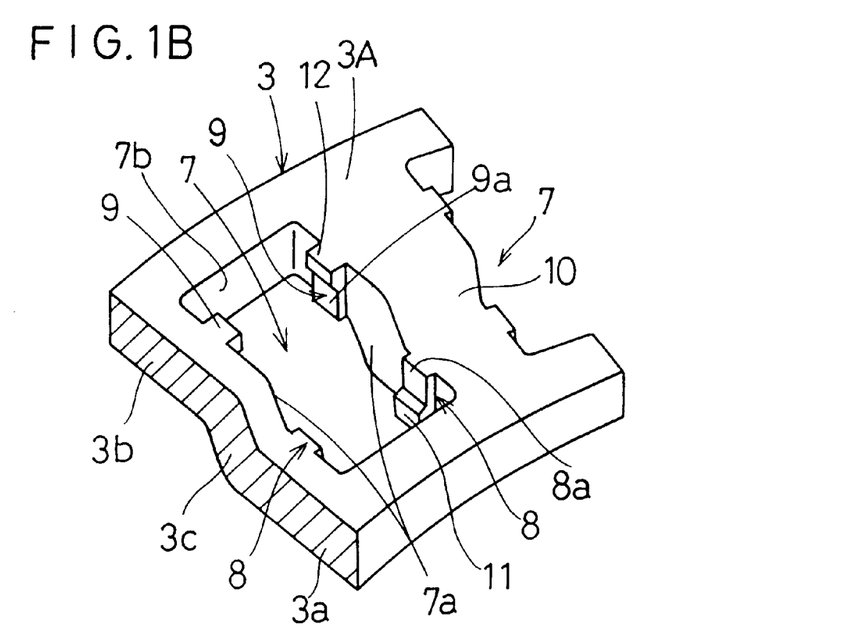
FIG. 1B is a fragmentary perspective view of a portion of a roller retainer used in the thrust roller bearing shown in FIG. 1A.

The roller retainer 3 includes an annular plate body 3A having a circumferential row of pockets 7 defined therein for accommodating the corresponding needle rollers 4. This annular plate body 3A has radially inner and outer portions 3a and 3b that are axially offset relative to each other with a portion 3c intermediate between the radially inner and outer portions 3a and 3b thereof so inclined or curved as to render the annular plate body 3A as a whole to represent a generally S-sectioned shape. This roller retainer 3 of the particular design may be configured by the use of, for example, any known press work and, in this configuration, the radially inner portion 3a and the radially outer portion 3b are positioned axially close towards respective portions of the raceway members 1 and 2 where the associated collars 1b and 2b are formed. Thus, respective tips of the collars 1b and 2b are held at a height lower than associated guide surfaces S1 and S2 of the raceway members 1 and 2 along which the needle rollers 3 roll. The neighboring pockets 7 in the retainer 3 are separated by a respective column 10.

Each of the pockets 7 in the roller retainer 3 is delimited by circumferentially opposite side faces 7a and radially opposite end faces 7b. A plurality of projections 8 and 9 are formed in the opposite side faces 7a so as to protrude into the respective pocket 7 from a full width of the side faces 7a, with the projections 8 and 9 positioned respectively in the radially inner and outer portions 3a and 3b of the annular plate body 3A. Of those projections 8 and 9, each projection 8 in the radially inner portion 3a of the annular plate body 3A has two consecutive regions, or upper and lower regions as viewed in FIG. 1B, separated by an imaginary plane lying generally intermediate of the thickness of the radially inner portion 3a with the lower region protruding from the associated side face 7a a distance greater than the distance of protrusion of the upper region thereof so as to define a respective roller retaining pawl 11 positioned close to a lower surface of the annular plate body 3A.

Similarly, each projection 9 in the radially outer portion 3b of the annular plate body 3A has two consecutive regions, or upper and lower regions as viewed in FIG. 1B, separated by an imaginary plane lying generally intermediate of the thickness of the radially outer portion 3b with the upper region protruding from the associated side face 7a a distance greater than the distance of protrusion of the lower region thereof so as to define a respective roller retaining pawl 12 positioned close to an upper surface of the annular plate body 3A.

It will thus be understood that each of the projections 8 and 9 as a whole has such a sectional shape that respective tips of the regions of the projection 8 or 9 where the associated roller retaining pawl 11 or 12 is formed and where no roller retaining pawl 11 or 12 is formed are flattened while a surface portion between the flattened regions of each projection 8 or 9 is tapered.

Figure 2A:
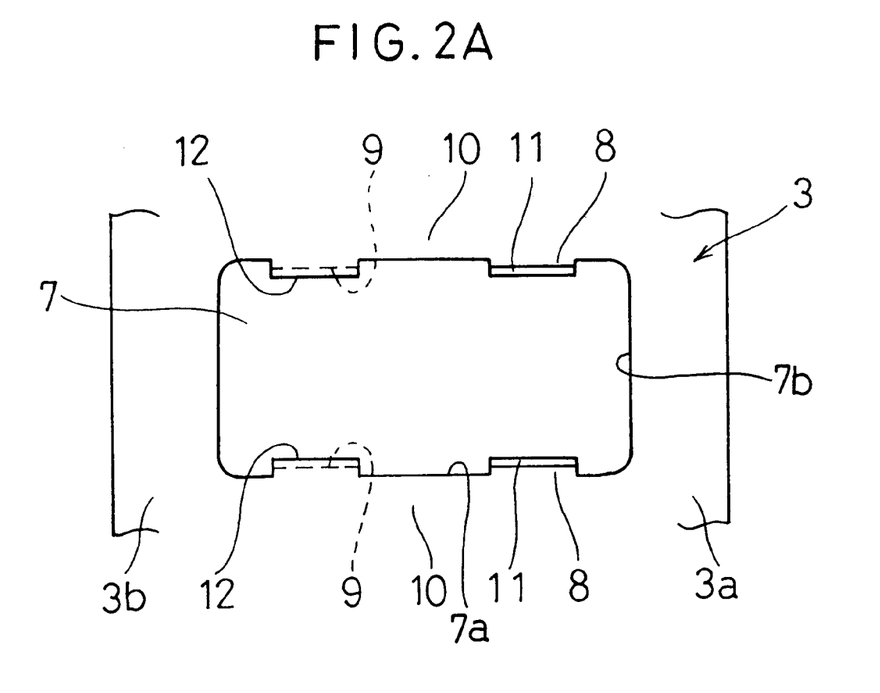
FIG. 2A is a fragmentary top plan view, showing a portion of the retainer shown in FIG. 1B.
Figure 2B:
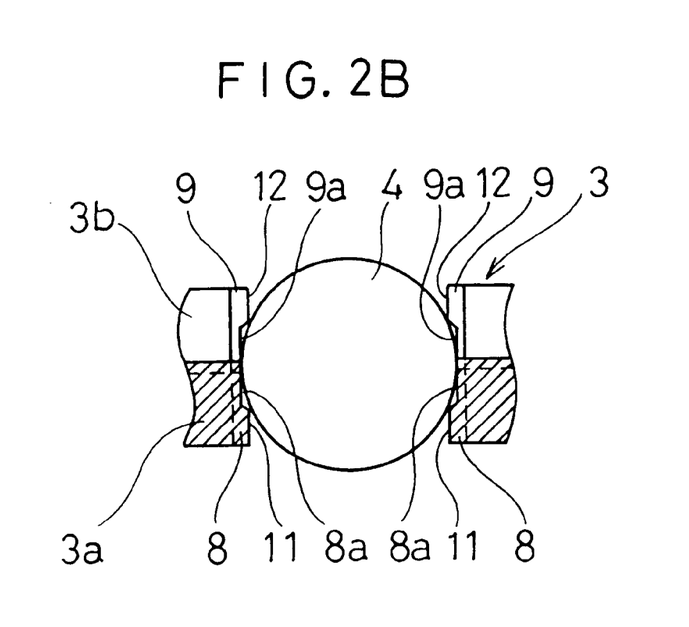
FIG. 2B is a fragmentary sectional view, showing the relation between the retainer and one of rollers.

Surface areas of the projections 8 and 9 except for the respective flattened tips of the roller retaining pawls 11 and 12 are utilized as roller guide faces 8a and 9a which has been subjected to a shaping process. Formation of those roller retaining pawls 11 and 12 and the shaping process of the roller guide faces 8a and 9a are carried out by drawing the projections 8 and 9. The needle roller 4 accommodated within each pocket 7 is supported at six locations by the paired roller retaining pawls 11 and 12 and the opposite end faces 7b of the respective pocket 7.

Figures 3A, 3B:
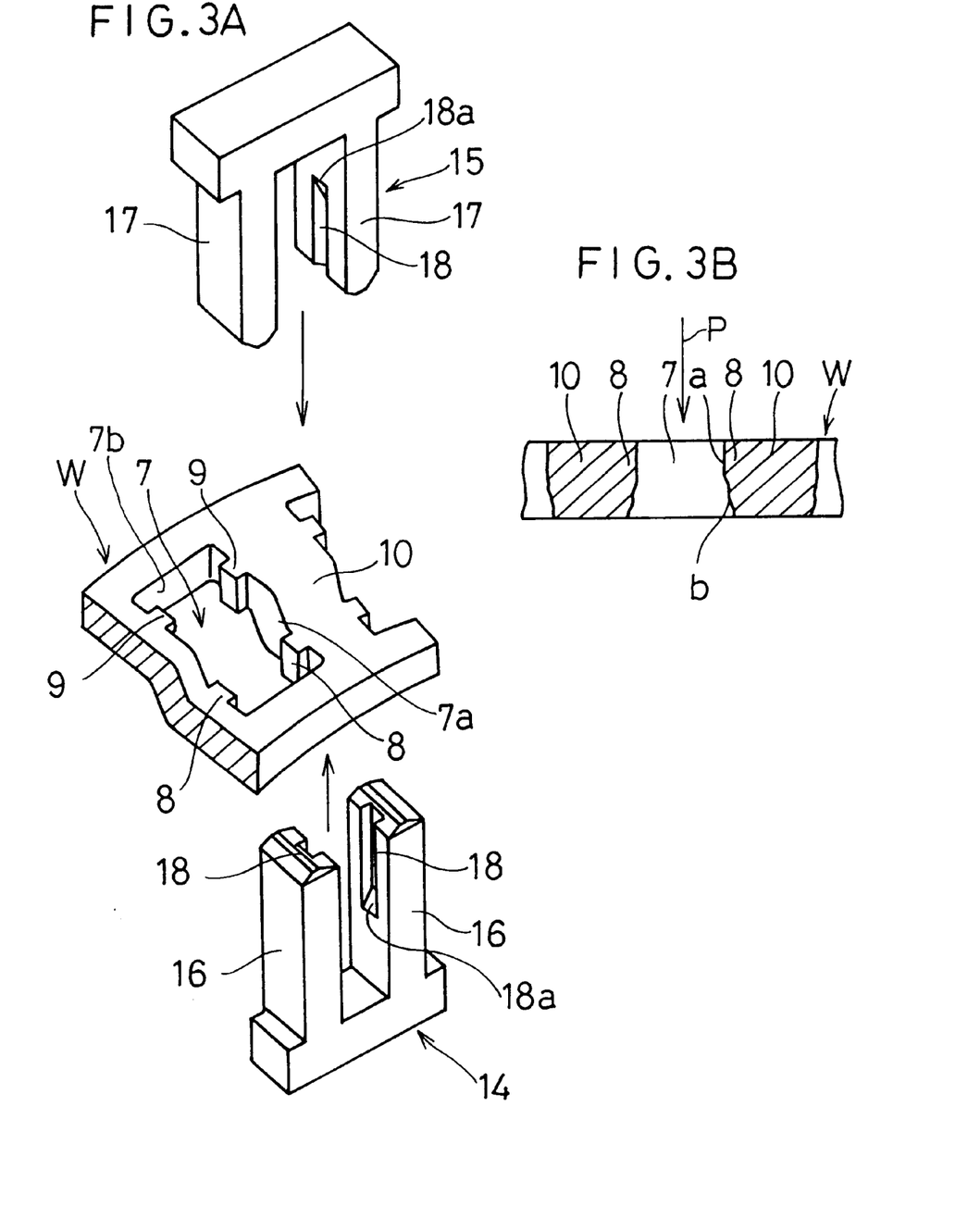
FIG. 3A is a schematic perspective view showing the sequence of formation of roller retaining pawls used in the roller retainer.
FIG. 3B is a fragmentary sectional view of a starting material before formation of the roller retaining pawls.

FIG. 3A illustrates an example of the manner by which the roller retaining pawls 11 and 12 are formed in each pocket 7 in the roller retainer 3. As shown therein, an annular plate which has been blanked out from a flat plate and which has subsequently been shaped to have a generally S-shaped section, followed by a press work to define the pockets 7 each having the projections 8 and 9 is prepared as a starting material W for the retainer 3 before the roller retaining pawls 11 and 12 are formed. At this time, each of the projections 8 and 9 have their entirety in a direction thicknesswise of the annular plate which are of the same height, it being, however, to be noted that sheared faces a and a broken face b shown in FIG. 3B and formed as a result of the blanking operation are displaced relative to each other in a circumferential direction.

Pawl forming jigs 14 and 15 are subsequently pressed from below and above, respectively, towards the column 10 between the neighboring pockets 7 to thereby perform a drawing operation on the projections 8 and 9. The pawl forming jig 14 shown in a lower portion of FIG. 3A is used to draw the radially inner projections 8 while the pawl forming jig 15 shown in an upper portion of FIG. 3A is used to draw the radially outer projections 9. Each of the pawl forming jigs 14 and 15 is of a design including a pair of straddling arms 16 or 17 each having an inner surface formed with a respective drawing groove 18 so as to extend axially of the corresponding arm 16 or 17. The drawing grooves 18 so defined in the respective inner surfaces of the paired straddling arms 16 or 17 confront with each other. Each drawing groove 18 has one end inclined so as to define an inclined shaping face 18a and the opposite end opening outwardly from a free end of the corresponding straddling arm 16 or 17. The drawing groove 18 in each of the straddling arms 16 or 17 in each pawl forming jig 14 or 15 has a width equal to the width of each of the projections 8 and 9. At the same time, the straddling arms 16 or 17 of each of the pawl forming jigs 14 and 15 are spaced an inner distance which is equal to or smaller than the minimum width of a portion of the column 10 where the projections 8 and 9 are formed.

By carrying out the drawing operation with the use of the pawl forming jigs 14 and 15 of the design described above, the projections 8 and 9 of a shape conforming to the shape of the drawing grooves 18 can be formed simultaneously with formation of the roller retaining pawls 11 and 12, with the consequence that each of the projections 8 and 9 is shaped to have a flat faces of a highly precise dimensional accuracy. In other words, while in the starting material W, the tip faces of the projections 8 and 9 and the side faces 7a of each pocket 7 represent such a shape that the broken face b is set backwards from the tip face a since, as shown in FIG. 3B, during the blanking operation a punch advances in a direction P along the depth of the respective pocket 7 to leave the sheared face a on one side of advance of the punch and the broken face b on one side of protrusion of the punch, respectively. Surface irregularities brought about by the presence of the shear face a and the broken face b are eliminated by the drawing operation.

Since in this thrust roller bearing assembly of the structure described above the roller retaining system is employed in which the projections 8 and 9 are formed in the side faces of each of the pockets 7 in the roller retainer 3 with the roller retaining pawls 11 and 13 having been formed in respective portions of those projections 8 and 9, the starting material having a sufficiently large thickness can be employed as compared with the prior art W-shaped roller retainer shown in FIGS. 7A to 8. In other words, referring to FIG. 7B, if the plate thickness of the roller retainer 53 is increased, the roller retaining pawls 58 and 59 will become thick, resulting in decrease in size of the retaining gap g between the roller retaining pawls 58 and 59 which is in turn accompanied by reduction in capability of the roller retainer 53 to retain the rollers 54. Accordingly, the plate thickness of the roller retainer 53 can not be reduced. In contrast thereto, according to the present invention, by way of example, in the case of the roller retainer 3 of the generally S-sectioned configuration as shown therein, it is possible to use the starting material W of a thickness which may be about twice that employed in the prior art. Accordingly, the amount of stresses acting on the retainer columns 10 under the influence of the intermittent load which would occur when the thrust roller bearing assembly is used in the previously described automobile transmission can advantageously be reduced, for example, down to about ⅓ of that in the prior art. By way of example, assuming that the rollers have a diameter of 2 mm, the plate thickness required in the prior art W-shaped roller retainer is within the range of 0.4 to 0.5 mm whereas the roller retainer 3 in the illustrated embodiment of the present invention can be designed and manufactured with the use of a plate thickness of about 0.8 mm.

Also, although the faces of the projections 8 and 9 have been described as used as the roller guide surfaces 8a and 9a, since the faces of each of the projections 8 and 9 is formed by the drawing operation to represent a smooth surface having a highly precise width, the precision with which the rollers 4 can be guided can be considerably increased as compared with the prior art guide structure in which the rollers are guided by the side faces 7a of each pocket which contain rough broken face resulting from the use of the press work. Accordingly, floatation and submergence of the rollers 4 relative to the roller retainer 3 can easily be managed and controlled and it is possible to employ a system in which the roller retainer 3 can be guided by the rollers 4 with no need to use any outer race guide nor any inner race guide.

As described above, the employment of the roller retaining pawls 11 and 12 formed in the projections 8 and 9 by the use of the drawing operation is effective to retain the lubricant oil on the roller guide surfaces thereby minimizing the possibility of the lubricant oil being run out on the roller guide surfaces and also eliminating any possible cause of peeling.

In addition, since the roller retainer 3 of the structure described above has a simplified sectional shape as compared with the prior art W-shaped roller retainer, the number of steps used in the press work can be reduced advantageously and, hence, the manufacture can correspondingly be facilitated.

According to the first embodiment of the present invention described above, the radially inner portion 3a and the radially outer portion 3b of the roller retainer 3 are formed so as to be axially close towards those portions of the raceway members 1 and 2 where the collars 1b and 2b are formed. Accordingly, even though the retaining pawls 5 and 6 are formed, the respective free ends of the collars 1b and 2b are held at a portion axially set back from the adjacent raceways S1 and S1 of the respective raceway members 1 and 2. For this reason, relatively large gaps d1 and d2 can be secured between the collar 1b and the adjacent raceway member 2 and between the collar 2b and the adjacent raceway member 1, respectively, thereby facilitating the flow of a lubricant oil internally of the bearing assembly. It is therefore possible to accomplish an effective lubrication where the thrust roller bearing assembly is used in a fashion in which the lubricant oil splashes over the thrust roller bearing assembly.

Figure 4:
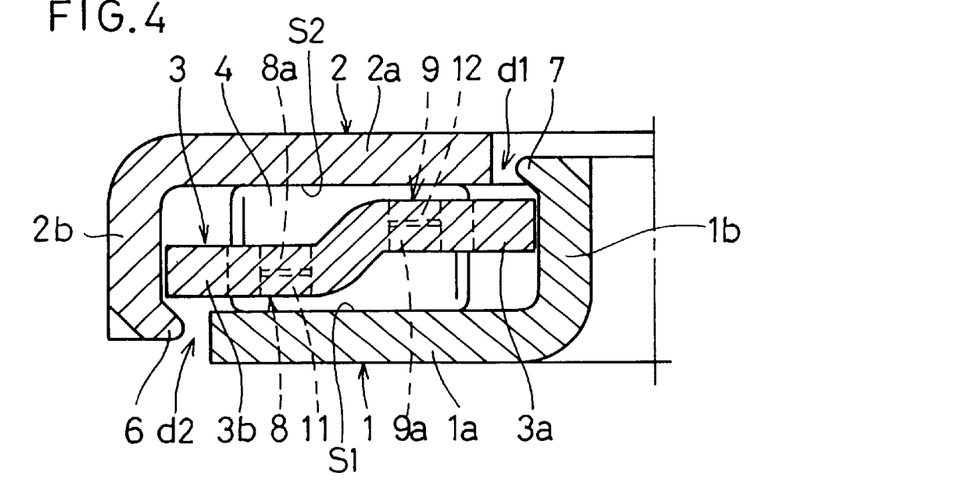
FIG. 4 is a fragmentary sectional view of the thrust roller bearing assembly according to a second preferred embodiment of the present invention.

FIG. 4 illustrates a second preferred embodiment of the present invention. This second preferred embodiment of the present invention differs from the previously described first embodiment in that the radially inner and outer portions 3a and 3b of the roller retainer 3 shown in FIG. 4 are so formed as to be axially separated away from those portions of the raceway members 1 and 2 where the associated collars 1b and 2b are formed. As a result, the tips of the respective collars 1b and 2b of the raceway members 1 and 2 are held at a level higher than the respective raceways S1 and S2 of the confronting raceway members 2 and 1 along which the rollers 4 are guided.

For this reason, the respective gaps d1 and d2 between the collar 1b and the raceway member 2 and between the collar 2b and the raceway member 1 are reduced as compared with those in the previously described first embodiment and, therefore, when a grease is filled internally in the thrust roller bearing assembly, any possible leakage of the grease outwardly from the thrust roller bearing assembly can be immunized to increase the duration during which lubrication can be accomplished.

Other structural features and effects in this embodiment are similar to those shown in and described with reference to FIGS. 1A to 2B.

Figure 5:
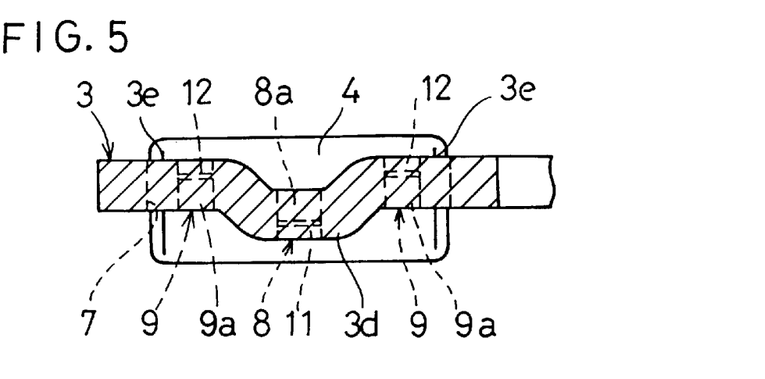
FIG. 5 is a fragmentary sectional view, showing the relation between the roller retainer and one of the roller used in the thrust roller bearing assembly according to a third preferred embodiment of the present invention.

A third preferred embodiment of the present invention is shown in FIG. 5. This third preferred embodiment differs from the previously described first embodiment in that, as shown in FIG. 5, the intermediate portion 3d of the roller retainer 3 has a sectional shape so formed as to protrude in one side along the axial direction. Specifically, the sectional shape of an intermediate portion 3d of the roller retainer 3 in this third embodiment represents a generally grooved trapezoidal shape. The projections 8 and 9 formed in the side faces of each pocket 7 are provided at three locations for each side face of the respective pocket 7, that is, a portion of the side face of the protruding intermediate portion 3d and respective portions of the side face of portions 3e on respective sides of the intermediate portion 3d. The projection 8 in the intermediate portion 3d is formed with the roller retaining pawl 11 adjacent a surface of the roller retainer 3 to which the intermediate portion 3d protrudes (a lower surface as viewed in FIG. 5) while the projections 9 on both sides are formed with the respective roller retaining pawls 12 adjacent the opposite surface (an upper surface as viewed in FIG. 5).

In the structure according to the third embodiment of the present invention, each of the rollers 4 can be retained by the paired roller retaining pawls 11 and 12, the number of which is six. Because of this, even when the length/diameter ratio of each roller is large, each roller 4 can be supported by the roller retaining pawls 11 and 12 in a stabilized fashion.

Figure 6:
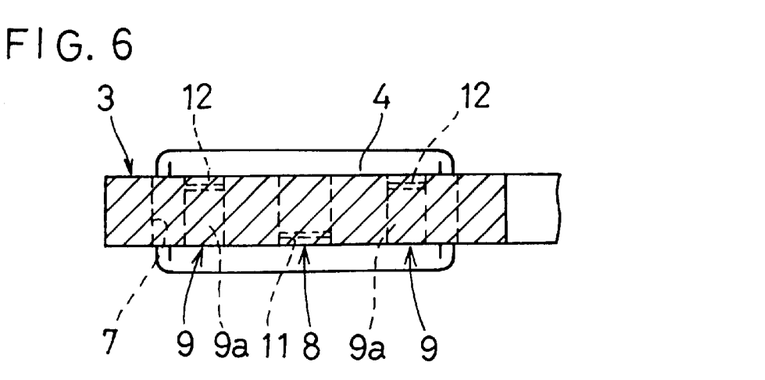
FIG. 6 is a fragmentary sectional view, showing the relation between the roller retainer and one of the roller used in the thrust roller bearing assembly according to a fourth preferred embodiment of the present invention.

FIG. 6 illustrates a fourth preferred embodiment of the present invention. In this fourth embodiment, the retainer 3 in its entirety is in the form of an annular flat plate. The projections 8 and 9 in the opposite side faces of each of the pockets 7 in the roller retainer 3 are provided at three locations for each side face of the respective pocket 7, that is, radially inner and outer portions and a portion intermediate therebetween. The projections 8 in the intermediate portion are formed with the roller retaining pawls 11 on one side adjacent the lower surface of the roller retainer 3 while the projections 9 in the radially inner and outer portions are formed with the roller retaining pawls 12 on the other side adjacent the upper surface of the roller retainer 3.

Even with this structure, each of the rollers 4 can be retained by the paired roller retaining pawls 11 and 12, six in total number. In this fourth embodiment, since the roller retainer 3 is in the form of an annular flat plate, the roller retainer 3 can have an increased thickness. Moreover, since the roller retainer 3 is in the form of an annular flat plate, it can be advantageously utilized where the length/diameter ratio of each roller is large, each roller 4 can be supported by the roller retaining pawls 11 and 12 in a stabilized fashion.

Other structural features and effects in any of the third and fourth embodiments are similar to those shown in and described with reference to FIGS. 1A to 2B.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in describing any of the first to fourth preferred embodiments of the present invention, the roller retainer 3 has been formed from a steel plate by the use of the press work, the roller retainer employed in the practice of the present invention may be made of a synthetic resin.

Accordingly, such changes and modifications are, unless they depart from the scope of the present invention as delivered from the claims annexed hereto, to be construed as included therein.

What is claimed is:

1. A thrust roller bearing assembly which comprises:

first and second raceway members;

a plurality of rolling elements;

a generally plate-like annular roller retainer having a plurality of pockets defined therein in a circumferentially extending row, said rolling elements being rollingly accommodated within the corresponding pockets, each of said pockets being delimited by opposite side faces and opposite end faces;

a plurality of projections formed in each of the opposite side faces defining the respective pocket in the roller retainer, so as to protrude into the respective pocket, some of said projections in each of the opposite side faces being formed with respective roller retaining pawls positioned adjacent one principal surface of the roller retainer while the remaining projections are formed with respective roller retaining pawls positioned adjacent the other principal surface of the roller retainer, all of said projections having respective surfaces except the roller retaining pawls, which surfaces are used as guide faces for the rolling elements.

2. The thrust roller bearing assembly as claimed in claim 1, wherein the roller retainer carrying the rolling elements is interposed between the first and second raceway members, and wherein the first raceway member comprises a first annular plate having a radially inner edge formed with a first cylindrical collar so as to protrude therefrom towards the second raceway member while the second raceway member comprises a second annular plate having a radially outer edge formed with a second cylindrical collar so as to protrude therefrom towards the first raceway member, each of said first and second collars having respective retaining pawls axially engageable with the roller retainer while the first and second raceway members are axially spaced a distance from each other, whereby the first and second raceway members and the roller retainer are non-separably assembled into a trinitarian unitary structure by the engagement of the retaining pawls.

3. The thrust roller bearing assembly as claimed in claim 2, wherein a radially intermediate portion has a sectional shape protruding in one of opposite axial directions and wherein the projections on each of the side faces defining the respective pocket are formed at three locations including the radially intermediate portion and portions on respective sides of the radially intermediate portion and wherein the projections on the opposite side faces at the radially intermediate portion are provided with roller retaining pawls adjacent a protruding surface area of the roller retainer while the projections on the opposite side faces at each of the portions on the respective sides of the radially intermediate portion are provided with roller retaining pawls adjacent a recessed surface area of the roller retainer.

4. The thrust roller bearing assembly as claimed in claim 2, wherein the roller retainer in its entirety is a flat plate and wherein the projections on each of the side faces defining the respective pocket are formed at three locations including a radially intermediate portion and portions on respective sides of the radially intermediate portion and wherein the projections on the opposite side faces at the radially intermediate portion are provided with roller retaining pawls positioned adjacent one principal surface of the roller retainer while the projections on the opposite side faces at each of the portions on the respective sides of the radially intermediate portion are provided with roller retaining pawls positioned adjacent the other principal surface of the roller retainer.

5. The thrust roller bearing assembly as claimed in claim 2, wherein the roller retainer is a press molded product made of steel and wherein the roller retaining pawls are formed by drawing the projections.

6. The thrust roller bearing assembly as claimed in claim 2, wherein the retainer has radially inner and outer portions that are axially offset in position relative to each other with an intermediate portion between the radially inner and outer portions being inclined or curved to render the retainer to have a generally S-shaped section, said radially inner and outer portions of the retainer being axially close towards respective portions of the first and second raceway members where the associated collars are formed.

7. The thrust roller bearing assembly as claimed in claim 6, wherein the roller retainer is a press molded product made of steel and wherein the roller retaining pawls are formed by drawing the projections.

8. The thrust roller bearing assembly as claimed in claim 2, wherein the retainer has radially inner and outer portions that are axially offset in position relative to each other with an intermediate portion between the radially inner and outer portions being inclined or curved to render the retainer to have a generally S-shaped section, said radially inner and outer portions of the retainer being axially separated from respective portions of the first and second raceway members where the associated collars are formed.

9. The thrust roller bearing assembly as claimed in claim 8, wherein the roller retainer is a press molded product made of steel and wherein the roller retaining pawls are formed by drawing the projections.

10. The thrust roller bearing assembly as claimed in claim 1, wherein a radially intermediate portion has a sectional shape protruding in one of opposite axial directions and wherein the projections on each of the side faces defining the respective pocket are formed at three locations including the radially intermediate portion and portions on respective sides of the radially intermediate portion and wherein the projections on the opposite side faces at the radially intermediate portion are provided with roller retaining pawls adjacent a protruding surface area of the roller retainer while the projections on the opposite side faces at each of the portions on the respective sides of the radially intermediate portion are provided with roller retaining pawls adjacent a recessed surface area of the roller retainer.

11. The thrust roller bearing assembly as claimed in claim 10, wherein the roller retainer is a press molded product made of steel and wherein the roller retaining pawls are formed by drawing the projections.

12. The thrust roller bearing assembly as claimed in claim 1, wherein the roller retainer in its entirety is a flat plate and wherein the projections on each of the side faces defining the respective pocket are formed at three locations including a radially intermediate portion and portions on respective sides of the radially intermediate portion and wherein the projections on the opposite side faces at the radially intermediate portion are provided with roller retaining pawls positioned adjacent one principal surface of the roller retainer while the projections on the opposite side faces at each of the portions on the respective sides of the radially intermediate portion are provided with roller retaining pawls positioned adjacent the other principal surface of the roller retainer.

13. The thrust roller bearing assembly as claimed in claim 12, wherein the roller retainer is a press molded product made of steel and wherein the roller retaining pawls are formed by drawing the projections.

14. The thrust roller bearing assembly as claimed in claim 1, wherein the roller retainer is a press molded product made of steel and wherein the roller retaining pawls are formed by drawing the projections.

15. A roller retainer for a thrust roller bearing assembly which comprises an annular plate member having a plurality of pockets defined therein in a circumferential row, each of the pockets being delimited by opposite side faces and opposite end faces, and a plurality of projections formed in each of the opposite side faces defining the respective pocket in the roller retainer, so as to protrude into the respective pocket, some of said projections in each of the opposite side faces being formed with respective roller retaining pawls positioned adjacent one principal surface of the roller retainer while the remaining projections are formed with respective roller retaining pawls positioned adjacent the other principal surface of the roller retainer, all of said projections having respective surfaces except the roller retaining pawls, which surfaces are used as guide faces for the rolling elements.

* * * * *